(12) United States Patent
Lee et al.

(10) Patent No.: US 11,582,686 B2
(45) Date of Patent: Feb. 14, 2023

(54) ELECTRONIC DEVICE AND METHOD FOR SEARCHING FOR PLMN IN WIRELESS COMMUNICATION SYSTEM

(71) Applicant: Samsung Electronics Co., Ltd., Suwon-si (KR)

(72) Inventors: Shinduck Lee, Suwon-si (KR); Hyunchul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 17/265,507

(22) PCT Filed: Jun. 7, 2019

(86) PCT No.: PCT/KR2019/006855
§ 371 (c)(1),
(2) Date: Feb. 2, 2021

(87) PCT Pub. No.: WO2020/027428
PCT Pub. Date: Feb. 6, 2020

(65) Prior Publication Data
US 2021/0204203 A1   Jul. 1, 2021

(30) Foreign Application Priority Data
Aug. 2, 2018  (KR) .................. 10-2018-0090178

(51) Int. Cl.
H04W 4/00      (2018.01)
H04W 48/16    (2009.01)
(Continued)

(52) U.S. Cl.
CPC .......... H04W 48/16 (2013.01); H04W 48/08 (2013.01); *H04W 88/02* (2013.01)

(58) Field of Classification Search
CPC .................. H04W 48/08; H04W 48/16
(Continued)

(56) References Cited

U.S. PATENT DOCUMENTS 9,591,557 B2   3/2017   Miao et al.
9,712,983 B2   7/2017   Dandra et al.
(Continued)

FOREIGN PATENT DOCUMENTS

CN    107787027 A    3/2018
JP      5902355 B2    3/2016
(Continued)

OTHER PUBLICATIONS

Supplementary Partial European Search Report dated Aug. 25, 2021 in connection with European Patent Application No. 19 84 3755, 38 pages.
(Continued)

*Primary Examiner* — Temica M Beamer

(57) ABSTRACT

An electronic device according to various embodiments can comprise: a housing; a wireless communication circuit located in the housing; a processor operationally connected to the wireless communication circuit; and a memory located inside the housing and operationally connected to the processor, wherein the memory can store instructions such that, when executed, the processor performs camp-on on a cell of a first base station through the wireless communication circuit, receives, from the first base station, information related to a network related to the first base station, identifies a state in which no service is provided from the first base station to the electronic device, and searches for a registered public land mobile network (RPLMN) on the basis of at least a portion of the received information.

7 Claims, 9 Drawing Sheets

(51) Int. Cl.
  *H04W 48/08* (2009.01)
  *H04W 88/02* (2009.01)
(58) Field of Classification Search
  USPC .......................................................... 370/328
  See application file for complete search history.

(56) References Cited

U.S. PATENT DOCUMENTS

| | | | |
|---|---|---|---|
| 9,872,236 | B2 | 1/2018 | Lee |
| 2003/0040311 | A1 | 2/2003 | Choi |
| 2008/0153486 | A1 | 6/2008 | Ramkull et al. |
| 2014/0092805 | A1 | 4/2014 | van de Ven et al. |
| 2015/0296364 | A1 | 10/2015 | Peruru et al. |
| 2016/0337946 | A1 | 11/2016 | Kim et al. |
| 2017/0094591 | A1 | 3/2017 | Namboodiri et al. |
| 2017/0215227 | A1 | 7/2017 | Duan et al. |
| 2017/0353851 | A1 | 12/2017 | Gonzalez et al. |
| 2017/0353915 | A1 | 12/2017 | da Silva et al. |
| 2018/0063751 | A1 | 3/2018 | Shi et al. |
| 2018/0063774 | A1 | 3/2018 | Gupta et al. |
| 2018/0199181 | A1* | 7/2018 | Jung ................. H04W 8/005 |
| 2019/0174406 | A1 | 6/2019 | Hwang et al. |

FOREIGN PATENT DOCUMENTS

| | | |
|---|---|---|
| KR | 10-2009-0048109 A | 5/2009 |
| KR | 10-2014-0146820 A | 12/2014 |
| KR | 10-2015-0115675 A | 10/2015 |
| KR | 10-2018-0018448 A | 2/2018 |

OTHER PUBLICATIONS

Notice of Preliminary Rejection dated Oct. 27, 2021 in connection with Korean Patent Application No. 10-2018-0090178, 21 pages.
Samsung, "PLMN Selection in RRC Inactive state", 3GPP TSG-RAN WG2 100 meeting, Nov. 27-Dec. 1, 2017, Tdoc R2-1713448, 4 pages.
International Search Report dated Sep. 19, 2019 in connection with International Patent Application No. PCT/KR2019/006855, 2 pages.
Written Opinion of the International Searching Authority dated Sep. 19, 2019 in connection with International Patent Application No. PCT/KR2019/006855, 6 pages.
European Patent Office, "Supplementary European Search Report" dated Nov. 26, 2021, in connection with European Patent Application No. EP19843755.0, 27 pages.
Notice of Patent Grant dated Apr. 27, 2022, in connection with Korean Application No. 10-2018-0090178, 4 pages.

* cited by examiner

ELECTRONIC DEVICE AND METHOD FOR SEARCHING FOR PLMN IN WIRELESS COMMUNICATION SYSTEM

CROSS-REFERENCE TO RELATED APPLICATIONS

This application is a 371 of International Application No. PCT/KR2019/006855 filed on Jun. 7, 2019, which claims priority to Korean Patent Application No. 10-2018-0090178 filed on Aug. 2, 2018, the disclosures of which are herein incorporated by reference in their entirety.

BACKGROUND

1. Field

Various embodiments to be described below relate to an electronic device for searching for a public land mobile network (PLMN) in a wireless communication system and an operation method thereof.

2. Description of Related Art

Electronic devices capable of performing cellular communication, such as a smartphone, a tablet personal computer (PC), a smart watch, and the like, are being developed.

As technology advances, various radio access technologies (hereinafter "RATs") for cellular communication are being introduced. Accordingly, electronic devices capable of performing communication using a plurality of RATs supported by a service provider are under development. Since different RATs use different radio frequency (RF) bands that do not overlap each other, an electronic device supporting a plurality of RATs may be configured to operate in the RF band of each RAT.

In the case where an electronic device supporting a plurality of RATs attempts to search for a PLMN, the electronic device may have to search for all RF bands of the plurality of RATs supported by the electronic device in order to search for an available PLMN. However, if the PLMN supports only some RATs, instead of supporting all the RATs supported by the electronic device, the operation of searching for the PLMN on all of the RATs may cause unnecessary current consumption and an increase in searching time. Therefore, a method for reducing the current consumption of the electronic device and PLMN searching time may be required.

The technical subjects pursued in the disclosure may not be limited to the above mentioned technical subjects, and other technical subjects which are not mentioned may be clearly understood, through the following descriptions, by those skilled in the art to which the disclosure pertains.

SUMMARY

An electronic device according to various embodiments may include: a housing; a wireless communication circuit positioned in the housing; a processor operatively connected to the wireless communication circuit; and a memory positioned in the housing and operatively connected to the processor, wherein the memory may store instructions that cause, when executed, the processor to perform camp-on on a cell of a first base station through the wireless communication circuit, receive, from the first base station, information related to a network related to the first base station, identify a state in which no service is provided from the first base station to the electronic device, and search for a registered public land mobile network (RPLMN), based at least in part on the received information.

An electronic device according to various embodiments may include: a housing; a wireless communication circuit positioned in the housing; a processor operatively connected to the wireless communication circuit; and a memory positioned in the housing and operatively connected to the processor, wherein the memory may store instructions that cause, when executed, the processor to perform camp-on on a cell of a first base station through the wireless communication circuit, store information related to a network, which is received from the first base station, and if the electronic device is rebooted after storing the information, search for a registered public land mobile network, based at least in part on the stored information.

An electronic device supporting a plurality of radio access technologies (RATs) according to various embodiments may include: at least one memory; a communication circuit; and at least one processor operatively coupled to the at least one memory and the communication circuit, wherein the at least one processor may be configured to receive at least one system information message through the communication circuit, identify at least one RAT among the plurality of RATs, based on the at least one system information message, and search for a public land mobile network (PLMN) on the at least one RAT.

An electronic device supporting a plurality of RATs according to various embodiments may include: at least one memory; a communication circuit; and at least one processor operatively coupled to the at least one memory and the communication circuit, wherein the at least one processor may be configured to: identify whether or not RAT information supported by a PLMN is stored in the electronic device; if the RAT information is stored in the electronic device, search for a PLMN on at least one RAT included in the stored RAT information; in response to registration of the electronic device in an available PLMN, identify RAT information supported by the registered PLMN; and, based on the identification, store the RAT information supported by the registered PLMN.

A method for operating an electronic device in a wireless communication system according to various embodiments may include: receiving at least one system information message; identifying at least one RAT among a plurality of RATs supported by the electronic device, based on the at least one system information message; and searching for a PLMN on the at least one RAT.

A method for operating an electronic device in a wireless communication system according to various embodiments may include: identifying whether or not RAT information supported by a PLMN is stored in the electronic device; if the RAT information is stored in the electronic device, searching for a PLMN on at least one RAT included in the stored RAT information; in response to registration of the electronic device in an available PLMN, identifying RAT information supported by the registered PLMN; and, based on the identification, storing the RAT information supported by the registered PLMN.

Advantageous Effects of Invention

An electronic device for searching for a PLMN and a method therefor according to various embodiments are able to enhance efficiency of resources consumed for searching for a PLMN by searching for a PLMN, based on information on RATs supported by the PLMN.

Advantageous effects obtainable from the disclosure may not be limited to the above mentioned effects, and other effects which are not mentioned may be clearly understood, through the following descriptions, by those skilled in the art to which the disclosure pertains.

DETAILED DESCRIPTION

Figure 1:
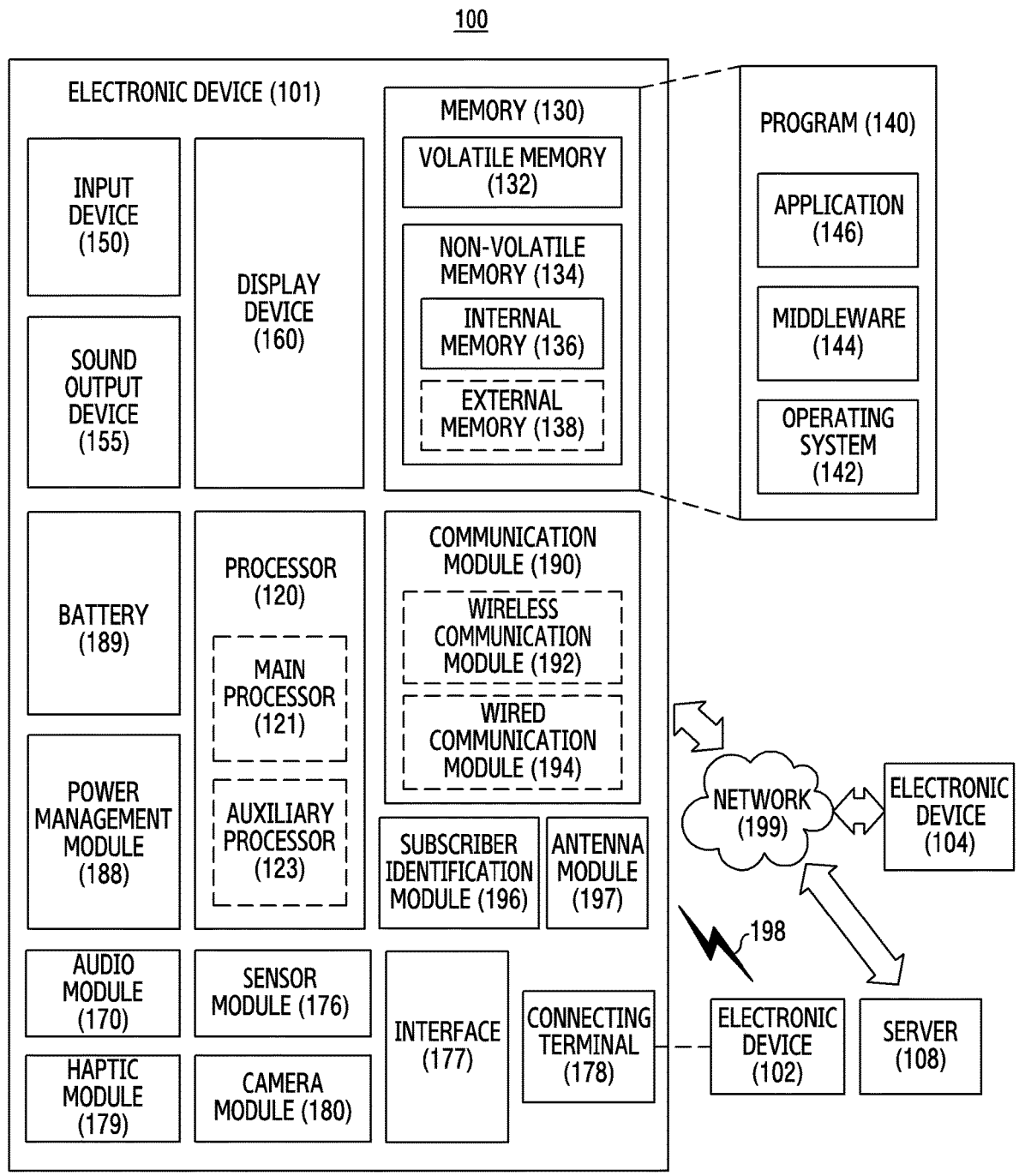
FIG. 1 is a block diagram of an electronic device in a network environment for searching for a PLMN according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
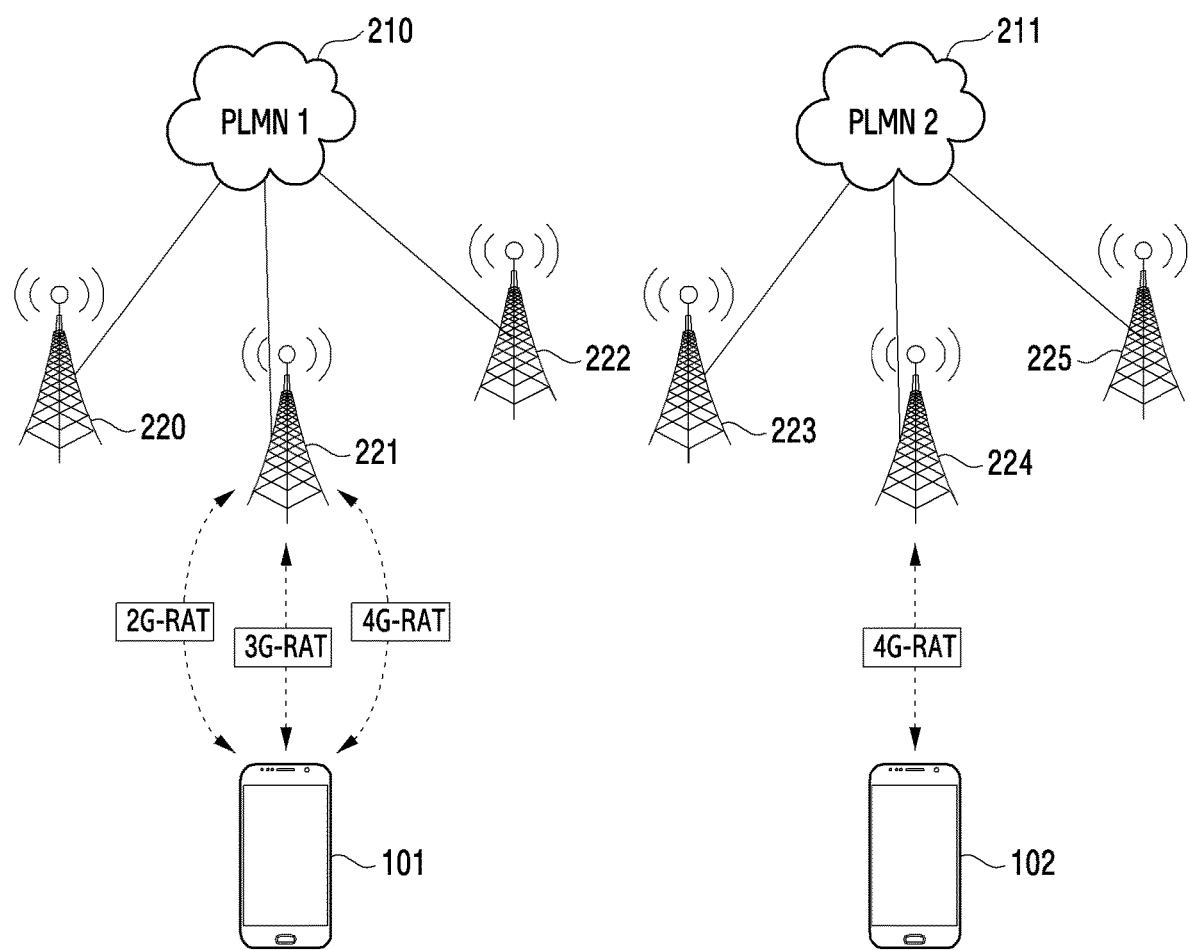
FIG. 2 illustrates an example of a wireless communication network according to various embodiments.

FIG. 2 illustrates an example of a wireless communication network according to various embodiments.

Referring to FIG. 2, a wireless communication network 200 may include public land mobile networks (PLMNs) 210 and 211, base stations 220, 221, 222, 223, 224, and 225, and electronic devices 101 and 102. The electronic devices may be the electronic device 101 and the electronic device 102 shown in FIG. 1.

In various embodiments, the wireless communication network 200 may include one or more PLMNs 210 and 211. Although it is shown that the PLMNs 210 and 211 do not overlap each other, in general, a plurality of PLMNs may overlap each other in various geographic areas.

In various embodiments, each of the PLMNs 210 and 211 may be identified by a unique PLMN identification (ID). The PLMN ID is information received through the base stations 220 to 225 such that the electronic devices 101 and 102 are able to distinguish between the PLMNs, and the PLMN ID may include mobile country code (MCC), mobile network code (MNC), location area identity (LAI), and PLMN operator identification code.

In various embodiments, the PLMNs 210 and 211 may provide cellular communication services to the electronic devices 101 and 102, respectively, based on specific RATs. For example, the RATs supported by the PLMN may be $2^{nd}$ generation (2G) RATs such as a global system for mobile communication (GSM), a general packet radio service (GPRS), enhanced data rates for GSM evolution (EDGE), and the like, $3^{rd}$ generation (3G) RATs such as wideband code division multiplex access (WCDMA) and the like, 4$^{th}$ generation (4G) RATs such as long term evolution (LTE) and the like, 5$^{th}$ generation (5G) RATs, or the like. In various embodiments, one PLMN ID may provide services, based on a plurality of different RATs. For example, an example in which PLMN 1 (210) provides all cellular communication services of 2G, 3G, and 4G RAT standards is illustrated in FIG. 2. In this case, as will be described later, the electronic device performing registration in a PLMN supporting a plurality of RATs may select one of the plurality of RATs supported by the PLMN within the limit supported by the electronic device, and may use communication services corresponding to the corresponding RAT standard.

The respective PLMNs 210 and 211 may communicate with one or more electronic devices 101 and 102 through one or more base stations 220, 221, 222, 223, 224, and 225. The respective base stations 220 to 225 may provide services to geographic areas that are able to be divided into one or more cells.

In various embodiments, in the case where the PLMN using the base stations supports a plurality of RATs, a plurality of different RAT networks may be provided to the same geographic area. For example, a plurality of RATs may be supported by one base station. For example, FIG. 2 shows an example in which one base station 221 provides services for all of 2G, 3G, and 4G networks. In general, when a plurality of RATs is deployed in the same geographic area, the frequency bands used by the respective RATs do not overlap each other.

In various embodiments, the respective base stations 220 to 225 may operate so as to transmit and receive information, signals, data, or messages to and from the electronic devices 101 and 102. In various embodiments, the respective base stations 220 to 225 may periodically transmit system information messages to the electronic devices so as to enable the electronic devices 101 and 102 entering the service areas of the base stations to detect the base stations.

The electronic devices 101 and 102 may be devices that receive cellular communication services from the base stations 220, 221, 222, 223, 224, and 225.

In various embodiments, the electronic devices 101 and 102 may perform a process of selecting one of the PLMNs 210 and 211 and performing registration therein in order to receive cellular communication services. In various embodiments, the electronic devices 101 and 102 may attempt to search for a PLMN when the electronic devices are turned on or after recovering from the lack of coverage. The electronic devices 101 and 102 may search for available PLMNs using all supportable RF bands. The electronic devices 101 and 102 may search for a cell having maximum signal strength, may receive a system information message from the cell, and may extract information on available PLMNs from the system information message. If one or more available PLMNs are extracted from the system information message, the electronic devices 101 and 102 may select a PLMN therefrom according to priority. The priority for selecting the PLMN may be as follows:

1. Most recently registered PLMN (RPLMN) or, if available, PLMNs equivalent thereto (equivalent RPLMNs, ERPLMNs)
2. Subscribed PLMN (home PLMN, HPLMN) or, if available, PLMNs equivalent thereto (equivalent HPLMNs, EHPLMNs)
3. Combination of PLMN/access technology included in data file "user controlled PLMN selector with access technology" of USIM
4. Combination of PLMN/access technology included in data file "operator controlled PLMN selector with access technology" of USIM
5. Combination of PLMN/access technology having best signal quality among other PLMNs
6. Combination of PLMN/access technology in order of good signal quality among other PLMNs If the PLMN is selected according to the priority, the electronic devices 101 and 102 may perform cell selection and location registration therein.

Although it is illustrated in FIG. 2 that electronic device 1 (101) registers in PLMN 1 (210) and electronic device 2 (102) registers in PLMN 2 (211) by way of example, the PLMN, in which the electronic device is able to register, is not necessarily fixed, and the registered PLMN may be changed in various embodiments.

In various embodiments, one or more PLMN IDs may be stored in the electronic devices 101 and 102. For example, information stored in the electronic devices 101 and 102 when users of the electronic devices 101 and 102 subscribe to the cellular communication service, such as information on the PLMN to which the user subscribed (home PLIVIM, HPLMN) and information on the PLMN in which the corresponding electronic devices 101 and 102 most recently registered (registered PLMN, RPLMN), may be stored in a user subscriber identity module (USIM). For example, assuming that electronic device 1 (101) subscribed to PLMN 1 (210), PLMN 1 (210) may be stored in electronic device 1 (101) as an HPLMN. For example, if electronic device 1 (101) registers in PLMN 1 (210), PLMN 1 (210) may be stored in electronic device 1 as an RPLMN.

In various embodiments, the electronic devices 101 and 102 may preferentially search for an RPLMN or HPLMN when searching for a PLMN. The electronic devices 101 and 102 may search for available PLMNs, and if there is a PLMN that matches a stored RPLMN or HPLMN, the electronic devices 101 and 102 may select the matching PLMN, and may then stop searching for the PLMN. Thereafter, the electronic device may perform selection of a cell among the cells of the selected PLMN and location registration therein.

In various embodiments, the electronic devices 101 and 102 may communicate with one of the base stations 220 to 225 that belong to the PLMNs 210 and 211. The electronic devices 101 and 102 may operate so as to transmit and receive information, signals, data, or messages to and from one of the base stations 220 to 225. For example, the electronic devices 101 and 102 may receive system information messages that are periodically broadcast by the base stations 220 to 225.

In various embodiments, the electronic devices 101 and 102 may operate based on a specific RAT. For example, the electronic devices 101 and 102 may use cellular communication services, based on at least one or more RATs among the RATs such as 2G (e.g., GSM), 3G (e.g., WCDMA), 4G (e.g., LTE), 5G, or the like. In various embodiments, one electronic device may support a plurality of RATs. For example, electronic device 1 (101) that has registered in PLMN 1 (210) in FIG. 2 may be an electronic device that supports all of 2G, 3G, and 4G RATs. In this case, although electronic device 1 (101) is able to use all communication services in 2G, 3G, and 4G standards provided by PLMN 1 (210), in general, electronic device 1 (101) may select one of them according to priority, and may access the same.

Figure 3:
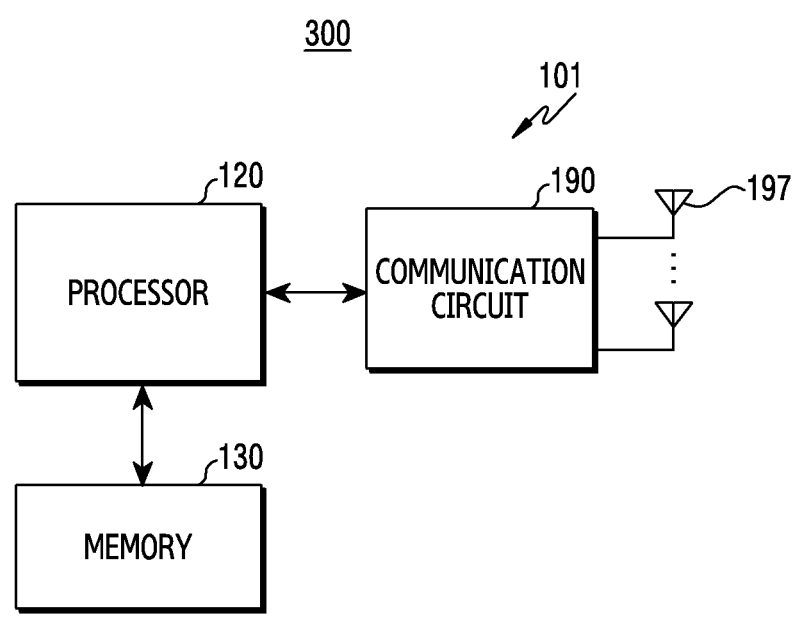
FIG. 3 is a block diagram of an electronic device for searching for a PLMN according to various embodiments.

FIG. 3 is a block diagram of an electronic device for searching for a PLMN according to various embodiments.

The electronic device shown in FIG. 3 may be the electronic device 101 shown in FIG. 1 and the electronic device 101 or 102 shown in FIG. 2.

Referring to FIG. 3, the electronic device 101 may include a processor 120, a memory 130, a communication circuit 190, and an antenna 197. In various embodiments, the processor 120 may include the processor 120 shown in FIG. 1, the memory 130 may include the memory 130 shown in FIG. 1, the communication circuit 190 may include the communication module 190 or the wireless communication module 192 shown in FIG. 1, and the antenna 197 may include the antenna 197 shown in FIG. 1.

In various embodiments, the electronic device 101 may be a device receiving a cellular communication service. For example, the electronic device 101 may be a mobile phone, a smartphone, a music player, a portable game console, a navigation system, a laptop computer, or the like, which is provided with a cellular communication service. Depending on communication standards or RATs, the electronic device 101 may be referred to as "user equipment (UE)", a "terminal", a "mobile station", a "station (STA)", or the like.

In various embodiments, the electronic device 101 may support a specific RAT for a cellular communication service. For example, the electronic device 101 may use a cellular communication service, based on at least one or more of the RATs such as 2G (e.g., GSM), 3G (e.g., WCDMA), 4G (e.g., LTE), 5G, or the like. In various embodiments, the electronic device 101 may support a plurality of RATs. For example, the electronic device may be an electronic device supporting all of 2G, 3G, and 4G RATs.

In various embodiments, the processor 120 may generate, obtain, process, or configure information, data, a message, or a signal to be transmitted using cellular communication. In various embodiments, the processor 120 may transmit, using cellular communication, the generated, obtained, processed, or configured information, data, message, or signal to another electronic device (e.g., the base station 221) by controlling the communication circuit 190. In various embodiments, the information, data, message, or signal transmitted to another electronic device (e.g., the base station 221) may include at least one piece of control information or user data.

In various embodiments, the processor 120 may receive, using cellular communication, information, data, a message, or a signal from another electronic device (e.g., the base station 221) by controlling the communication circuit 190. In various embodiments, the processor 120 may process the information, data, message, or signal received from another electronic device (e.g., the base station 221). In various embodiments, the information, data, message, or signal received from another electronic device (e.g., the base station 221) may include at least one piece of control information or user data.

In various embodiments, the processor 120 may perform the above-described operations, based on execution of at least one of instructions, code, software, or commands stored in the memory 130.

In various embodiments, the memory 130 may store control command code and control data (e.g., instructions, software, commands, etc.) for controlling the electronic device 101, or user data. For example, the memory 130 may store at least one of an application, an operating system (OS), middleware, or a device driver.

In various embodiments, the memory 130 may be operatively or operably coupled to the processor 120.

In various embodiments, the communication circuit 190 may perform functions for transmitting or receiving information, signals, data, or messages through a wireless channel using cellular communication. In various embodiments, the communication circuit 190 may perform a function of conversion between a baseband signal and a bitstream according to a physical-layer standard of the system. For example, when transmitting data, the communication circuit 190 may encode and modulate transmission bitstreams, thereby generating complex symbols. As another example, when receiving data, the communication circuit 190 may demodulate and decode a baseband signal, thereby restoring a reception bitstream.

The communication circuit 190 may up-convert the baseband signal into an RF band signal, and may transmit the same through the antenna 197. In various embodiments, the antenna 197 may be configured to be appropriate to a multiple-input-multiple-output (MIMO) scheme or a beam-based communication scheme. The communication circuit 190 may down-convert the RF band signal received through the antenna 197 into a baseband signal. For example, the communication circuit 190 may include a transmission filter, a reception filter, an amplifier, a mixer, an oscillator, a digital analog converter (DAC), an analog digital converter (ADC), and the like.

In various embodiments, the communication circuit 190 and the antenna 197 may support a plurality of RATs. The antenna 197 supporting a plurality of RATs may perform transmission and reception for respective RF bands of all the RATs, and the communication circuit 190 may convert the RF band signals of all the RATs into baseband signals, and vice versa.

In various embodiments, the communication circuit 190 may be operatively coupled to the processor 120.

In various embodiments, the processor 120 may receive at least one system information message. In various embodiments, the processor 120 may receive the system information message through the communication circuit 190. In various embodiments, the system information message may include information in order for the electronic device 101 to access a specific cell controlled by a base station (e.g., the base station 221) and to operate properly. For example, the system information message may include a PLMN ID, a cell ID, RAT information, frequency information, and information related to cell reselection.

In various embodiments, in the case where the electronic device 101 performs cellular communication using an LTE or WCDMA RAT, the system information message may be used to transmit system information blocks (SIBs). The SIBs may be periodically broadcast by the base station 221 to then be transmitted to the electronic device 101.

In various embodiments, the system information message may include information related to scheduling of other SIBs. For example, a list of SIBs to be transmitted and transmission periods thereof may be included in the system information message. For example, information related to scheduling of other SIBs may be included in the system information message such as SIB1.

In various embodiments, the system information message may include information related to inter-frequency or inter-RAT cell reselection. For example, the system information message may include a list of neighbor cells necessary for cell reselection.

In various embodiments, in the case of a system information message in the LTE standard, information related to cell reselection may be included in the system information message such as SIB5, SIB6, or SIB7. For example, inter-frequency neighbor-cell information may be included in SIB5. For example, WCDMA neighbor-cell information may be included in SIB6. For example, GSM neighbor-cell information may be included in SIB7. In various embodiments, in the case of a system information message in the WCDMA standard, information related to cell reselection may be included in the system information message such as SIB11, SIB12, or SIB19.

In various embodiments, the processor 120 may identify at least one RAT, based on the received system information message, from among a plurality of RATs supported by the electronic device 101. In various embodiments, the processor 120 may determine, based on the system information message, the RAT that is supported by the network (e.g., PLMNs 210 and 211) that transmitted the system message and/or the RAT that is not supported by the same.

In various embodiments, the processor 120 may identify at least one RAT, based on the information related to inter-frequency or inter-RAT cell reselection, which is included in the system information message. In various embodiments, the processor 120 may identify the at least one RAT from information on the neighbor cell necessary for cell reselection, which is included in the system information message. For example, the processor 120 may identify the at least one RAT by determining the RAT served by the neighbor cell included in the system information message.

For example, if the processor 120 receives a system information message in the LTE standard, the processor 120 may identify the at least one RAT, based on the system information message such as SIB5, SIB6, or SIB7 including information related to cell reselection. For example, if the processor 120 receives SIB5, and if SIB5 includes neighbor-cell information, the processor 120 may determine that the network that transmitted SIB5 supports LTE. For example, if the processor 120 receives SIB6, and if SIB6 includes neighbor-cell information, the processor may determine that the network that transmitted SIB6 supports WCDMA. For example, if the processor 120 receives SIB7, and if SIB7 includes neighbor-cell information, the processor 120 may determine that the network that transmitted SIB7 supports a GSM RAT.

For example, if the processor 120 receives a system information message in the WCDMA standard, the processor 120 may identify the at least one RAT using the system information message such as SIB11, SIB12, or SIB19 including information related to cell reselection. For example, if the processor 120 receives a system information message in the GSM standard, the processor 120 may identify the at least one RAT, based on the system information message such as an SI2 quarter including information related to cell reselection.

In various embodiments, the processor 120 may identify the at least one RAT, based on information related to scheduling of system information blocks (SIBs) included in the system information message. For example, if the processor 120 receives a system information message in the LTE or WCDMA standard, the processor 120 may identify the at least one RAT from the information related to scheduling of SIBs included in the received SIB1. For example, if SIB5, SIB6, or SIB7 is included in the list of SIBs to be transmitted, which is included in SIB1, the processor 120 may determine LTE, WCDMA, or GSM to be the RAT supported by the network that transmitted SIM in each case. Alternatively, if SIM or SIB7 is not included in the list of SIBs to be transmitted, the processor 120 may determine WCDMA or GSM to be the RAT that is not supported by the network that transmitted SIB1 in each case.

In various embodiments, the processor 120 may search for a PLMN on at least one identified RAT. In various embodiments, the processor 120 may search for an available PLMN using only the RF band of at least one identified RAT. For example, although the electronic device 101 supports all of 2G, 3G, and 4G RATs, if the at least one RAT includes only 4G, the processor 120 may search for an available PLMN using only the RF band of 4G, excluding the RF bands of 2G and 3G.

In various embodiments, if the processor 120 fails to find the PLMN on the at least one RAT, the processor 120 may search for a PLMN on all RATs supported by the electronic device 101. In various embodiments, the processor 120 may search for an available PLMN using all RF bands supported by the electronic device 101. For example, although the electronic device 101 supports all of 2G, 3G, and 4G RATs, if the at least one RAT includes only 4G, and if no available PLMN is found as a result of searching for the PLMN using only the RF band of 4G, the processor 120 may search for an available PLMN using all RF bands of 2G, 3G, and 4G.

In various embodiments, if the processor 120 fails to find a PLMN on the at least one RAT, the processor 120 may search for a PLMN on the RATs other than the at least one RAT, among a plurality of RATs supported by the electronic device 101. In various embodiments, the processor 120 may search for an available PLMN using a band that is not included in the RF band of the at least one RAT, among all RF bands supported by the electronic device 101. For example, although the electronic device 101 supports all of 2G, 3G, and 4G RATs, if the at least one RAT includes only 4G, and if no available PLMN is found as a result of searching for the PLMN using only the RF band of 4G, the processor 120 may search for an available PLMN using the RF bands of 2G and 3G.

In various embodiments, the searching for a PLMN on the at least one RAT may be searching for the PLMN in which the electronic device 101 most recently registered (registered PLMN, RPLMN). In various embodiments, if the searching for the PLMN fails as a result of searching for the RPLMN on the at least one RAT, the processor 120 may search for a PLMN other than the RPLMN (e.g., an HPLMN or the like). In this case, the processor 120 may perform searching on all the RATs supported by the electronic device 101, instead of performing searching on the at least one RAT.

In various embodiments, the electronic device 101 may repeat the searching for a PLMN for a predetermined time or until an available PLMN is found.

In various embodiments, the at least one RAT may be at least one of 2G, 3G, 4G, and 5G.

In various embodiments, the processor 120 may store the at least one RAT in order to use the same for searching for a PLMN. For example, the processor 120 may store the at least one RAT in response to selection of a PLMN. For example, the processor 120 may store the at least one RAT in response to completion of location registration therein. In various embodiments, the processor 120 may update an existing stored RAT with the at least one RAT.

In various embodiments, the processor 120 may store the at least one RAT in the memory 130. In various embodiments, the at least one stored RAT may be maintained without being deleted even while power is not supplied to the electronic device 101.

In various embodiments, the processor 120 may search for a PLMN on the at least one stored RAT. In various embodiments, the processor 120 may search for an available PLMN using only the RF band of the at least one stored RAT. For example, although the electronic device 101 supports all of the 2G, 3G, and 4G RATs, if only 4G is included in the stored RAT, the processor 120 may search for an available PLMN using only the RF band of 4G, excluding the RF bands of 2G and 3G. In various embodiments, if there is at least one stored RAT, the processor 120 may omit the operations of receiving a system information message for searching for the PLMN and identifying at least one RAT, based on the system information message.

In various embodiments, the processor 120 may identify that the electronic device, which was turned off after storing the at least one RAT, switches to a turn-on state. In response to the identification, the processor 120 may search for a PLMN on the at least one stored RAT. In various embodiments, the processor 120 may identify interruption of a communication service of the electronic device after storing the at least one RAT. In response to the identification, the processor 120 may search for a PLMN on the at least one stored RAT.

In various embodiments, if the processor 120 fails to find the PLMN on the at least one stored RAT, the processor 120 may search for a PLMN for all the RATs supported by the electronic device 101. In various embodiments, in response to identifying that the searching for a PLMN fails on the at least one stored RAT, the processor 120 may search for a PLMN on the RAT other than the at least one stored RAT, among the plurality of RATs.

In various embodiments, the processor 120 may identify whether or not RAT information supported by the PLMN is stored in the memory 130. In various embodiments, if there is RAT information stored in the memory 130, the processor 120 may search for a PLMN on at least one RAT included in the stored RAT information. For example, the processor 120 may search for an available PLMN using only the RF band of the at least one RAT included in the stored RAT information. In various embodiments, if there is no RAT information stored in the memory 130, the processor 120 may search for a PLMN on all the RATs supported by the electronic device 101.

In various embodiments, if an available PLMN is found as a result of searching for the PLMN, the processor 120 may register in the found PLMN in response thereto. The processor 120 may perform selection of a cell from among the cells of the found PLMN and location registration therein.

In various embodiments, the processor 120 may identify RAT information supported by the registered PLMN in response to registration of the electronic device 101 in the available PLMN. For example, the processor 120 may receive at least one system information message provided by the registered PLMN, and may identify at least one RAT supported by the registered PLMN, based on the at least one system message.

In various embodiments, the processor 120 may store the RAT information supported by the registered PLMN in the memory 130, based on the identification. For example, the processor 120 may update existing stored RAT information with the RAT supported by the registered PLMN.

As described above, the electronic device 101 supporting a plurality of RATs according to various embodiments may identify at least one RAT, based on the system information message, instead of searching for a PLMN on all supported RATs, and may search for a PLMN on only the at least one RAT, thereby reducing the time required for the searching for a PLMN. The electronic device 101 according to various embodiments may identify at least one RAT, based on the system information message, and may search for a PLMN only on the at least one RAT, thereby reducing current consumption during the searching for a PLMN. According to an embodiment, if the disclosure is applied to searching for an RPLMN, the time required for searching may be reduced as shown in Table 1 below. However, the disclosure is not limited thereto.

TABLE 1

| RAT | PLMN searching type | Time(sec) |
|---|---|---|
| 2G | Blind scan for RPLMN initiated by GMC | 8 |
| 3G | Blind scan for RPLMN performed by 3G RRC | 24 |
| LTE | Blind scan for RPLMN initiated by GMC | 21 |

As described above, an electronic device (e.g., the electronic device 101) according to various embodiments may include: a housing; a wireless communication circuit positioned in the housing; a processor operatively connected to the wireless communication circuit; and a memory positioned in the housing and operatively connected to the processor, wherein the memory may store instructions that cause, when executed, the processor to perform camp-on on a cell of a first base station through the wireless communication circuit, receive, from the first base station, information related to a network related to the first base station, identify a state in which no service is provided from the first base station to the electronic device, and search for a registered public land mobile network (RPLMN), based at least in part on the received information.

In various embodiments, the information related to the network may include at least one system information block (SIB), and the at least one SIB may include radio access technology (RAT) information, which is supported by the network. In various embodiments, the instructions may cause the processor to search for the RPLMN using the RAT information supported by the network. In various embodiments, the instructions may cause the processor to store the RAT information in the memory and, if the network information is changed, to update the RAT information.

In various embodiments, the instructions may cause the processor, if the RPLMN is not found by searching for the RPLMN, to search for an HPLMN using RAT information supported by the electronic device. In various embodiments, the instructions may cause the processor, if the HPLMN is not found by searching for the HPLMN, to search for a PLMN available for the electronic device.

An electronic device according to various embodiments described above may include: a housing; a wireless communication circuit positioned in the housing; a processor operatively connected to the wireless communication circuit; and a memory positioned in the housing and operatively connected to the processor, wherein the memory may store instructions that cause, when executed, the processor to perform camp-on on a cell of a first base station through the wireless communication circuit, store information related to a network, which is received from the first base station, and, if the electronic device is rebooted after storing the information, search for a registered public land mobile network (RPLMN), based at least in part on the stored information.

In various embodiments, the information related to the network may be received from the first base station through at least one system information message. In various embodiments, the at least one system information message may be used to provide information related to inter-frequency or inter-RAT cell reselection.

In various embodiments, the searching for the RPLMN may be performed in response to identifying that the rebooting is completed.

As described above, an electronic device (e.g., the electronic device 101) supporting a plurality of radio access technologies (RATs) according to various embodiments may include: at least one memory (e.g., the memory 130); a communication circuit (e.g., the communication circuit 190); and at least one processor (e.g., the processor 120) operatively coupled to the at least one memory and the communication circuit, wherein the at least one processor may be configured to receive at least one system information message through the communication circuit, identify at least one RAT among the plurality of RATs, based on the at least one system information message, and search for a public land mobile network (PLMN) on the at least one RAT.

In various embodiments, the at least one processor may be further configured to store at least one identified RAT in the memory in order to use the same in searching for a PLMN.

In various embodiments, the at least one system information message may be information related to inter-frequency or inter-RAT cell reselection. In various embodiments, the at least one system information message may be information related to scheduling of system information blocks (SIBs).

In various embodiments, the at least one processor may be further configured to search for a PLMN on a RAT other than the at least one RAT among the plurality of RATs in response to identifying that the searching for a PLMN on the at least one RAT fails.

In various embodiments, the at least one processor may be further configured to: in response to selection of an available PLMN as a result of searching for a PLMN on the at least one RAT, register in the selected PLMN; in response to the registration, identify at least one RAT, based on a system information message of the registered PLMN; and store the at least one identified RAT in the memory.

In various embodiments, the searching for a PLMN on the at least one RAT is searching for the PLMN in which the electronic device most recently registered (registered PLMN).

In various embodiments, the RAT may be at least one of 2G, 3G, 4G, and 5G.

Figure 4A:
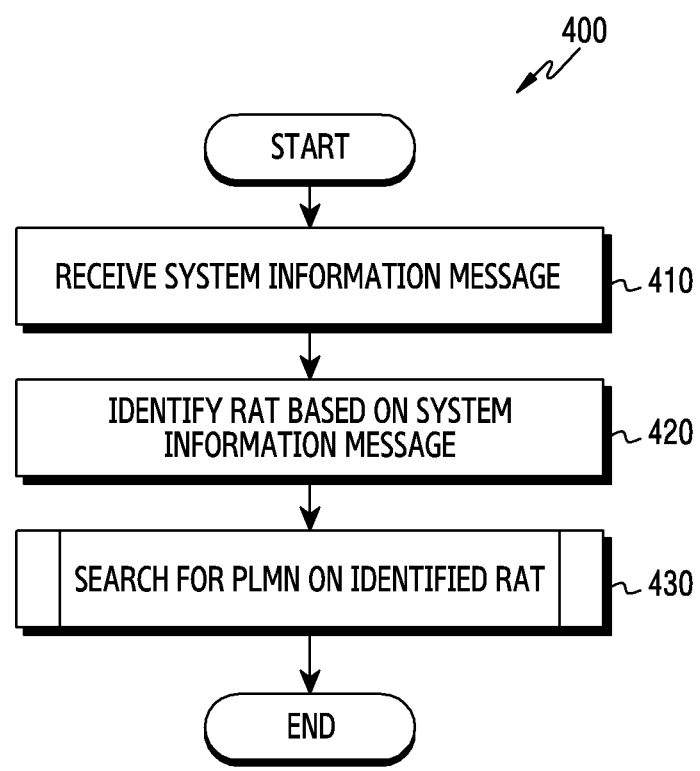
FIG. 4A illustrates an example of an operation in which an electronic device searches for a PLMN according to various embodiments.

FIG. 4A illustrates an example of an operation in which an electronic device searches for a PLMN according to various embodiments. This operation may be performed by the electronic device 101 shown in FIG. 1, the electronic device 101 or the electronic device 102 shown in FIG. 2, the electronic device 101 shown in FIG. 3, or the processor 120 of the electronic device 101.

Referring to FIG. 4A, in operation 410, the electronic device 101 may receive at least one system information message. In various embodiments, the system information message may include information in order for the electronic device to access a specific cell controlled by the base station and to operate appropriately. For example, the system information message may include a PLMN ID, a cell ID, RAT information, frequency information, and information related to cell reselection.

In various embodiments, in the case where the electronic device 101 performs cellular communication using an LTE or WCDMA RAT, the system information message may be used to transmit system information blocks (SIBs). The SIBs may be periodically broadcast by the base station to then be transmitted to the electronic device 101.

In various embodiments, the system information message may include information related to scheduling of other SIBs. For example, a list of SIBs to be transmitted and transmission periods thereof may be included in the system information message. For example, information related to scheduling of other SIBs may be included in the system information message such as SIB1.

In various embodiments, the system information message may include information related to inter-frequency or inter-RAT cell reselection. For example, the system information message may include a list of neighbor cells necessary for cell reselection.

In various embodiments, in the case of a system information message in the LTE standard, information related to cell reselection may be included in the system information message such as SIB5, SIB6, or SIB7. For example, inter-frequency neighbor-cell information may be included in SIB5. For example, WCDMA neighbor-cell information may be included in SIB6. For example, GSM neighbor-cell information may be included in SIB7. In various embodiments, in the case of a system information message in the WCDMA standard, information related to cell reselection may be included in the system information message such as SIB11, SIB12, or SIB19.

In operation 420, the electronic device 101 may identify at least one RAT, based on the received system information message, among a plurality of supportable RATs. The electronic device 101 may determine the RAT supported by the network that transmitted the system message and/or the RAT that is not supported by the same, based on the system information message.

In various embodiments, the electronic device 101 may identify at least one RAT, based on information related to the inter-frequency or inter-RAT cell reselection, which is included in the system information message. In various embodiments, the electronic device 101 may identify the at least one RAT from information on a neighbor cell necessary for cell reselection, which is included in the system information message. For example, the electronic device 101 may identify the at least one RAT by determining the RAT served by the neighbor cell included in the system information message.

For example, if the electronic device 101 receives a system information message in the LTE standard, the electronic device 101 may identify the at least one RAT, based on the system information message such as SIB5, SIB6, or SIB7 including information related to cell reselection. For example, if the electronic device 101 receives SIB5, and if SIB5 includes neighbor-cell information, the electronic device 101 may determine that the network that transmitted SIB5 supports LTE. For example, if the electronic device 101 receives SIB6, and if SIB6 includes neighbor-cell information, the electronic device 101 may determine that the network that transmitted SIB6 supports WCDMA. For example, if the electronic device 101 receives SIB7, and if SIB7 includes neighbor-cell information, the electronic device 101 may determine that the network that transmitted SIB7 supports a GSM RAT.

For example, if the electronic device 101 receives a system information message in the WCDMA standard, the electronic device 101 may identify the at least one RAT using the system information message such as SIB11, SIB12, or SIB19 including information related to cell reselection. For example, if the electronic device 101 receives a system information message in the GSM standard, the electronic device 101 may identify the at least one RAT, based on the system information message such as an SI2 quarter including information related to cell reselection.

In various embodiments, the electronic device 101 may identify the at least one RAT, based on information related to scheduling of system information blocks (SIBs) included in the system information message. For example, if the electronic device 101 receives a system information message in the LTE or WCDMA standard, the electronic device 101 may identify the at least one RAT from a list of SIBs to be transmitted, which is included in the received SIB1. For example, if SIB5, SIB6, or SIB7 is included in the list of SIBs to be transmitted, which is included in SIB1, the electronic device 101 may determine LTE, WCDMA, or GSM to be the RAT supported by the network that transmitted SIB1 in each case. Alternatively, if SIB6 or SIB7 is not included in the list of SIBs to be transmitted, the electronic device 101 may determine WCDMA or GSM to be the RAT that is not supported by the network that transmitted SIB1 in each case.

In operation 430, the electronic device 101 may search for a PLMN on the at least one identified RAT. In various embodiments, the electronic device 101 may search for an available PLMN using only the RF band of the at least one identified RAT. For example, although the electronic device 101 supports all of 2G, 3G, and 4G RATs, if the at least one identified RAT includes only 4G, the electronic device 101 may search for an available PLMN using only the RF band of 4G, excluding the RF bands of 2G and 3G.

In various embodiments, the searching for a PLMN on the at least one RAT may be searching for the PLMN in which the electronic device 101 most recently registered (registered PLMN).

In various embodiments, the at least one RAT may be at least one of 2G, 3G, 4G, and 5G.

Figure 4B:
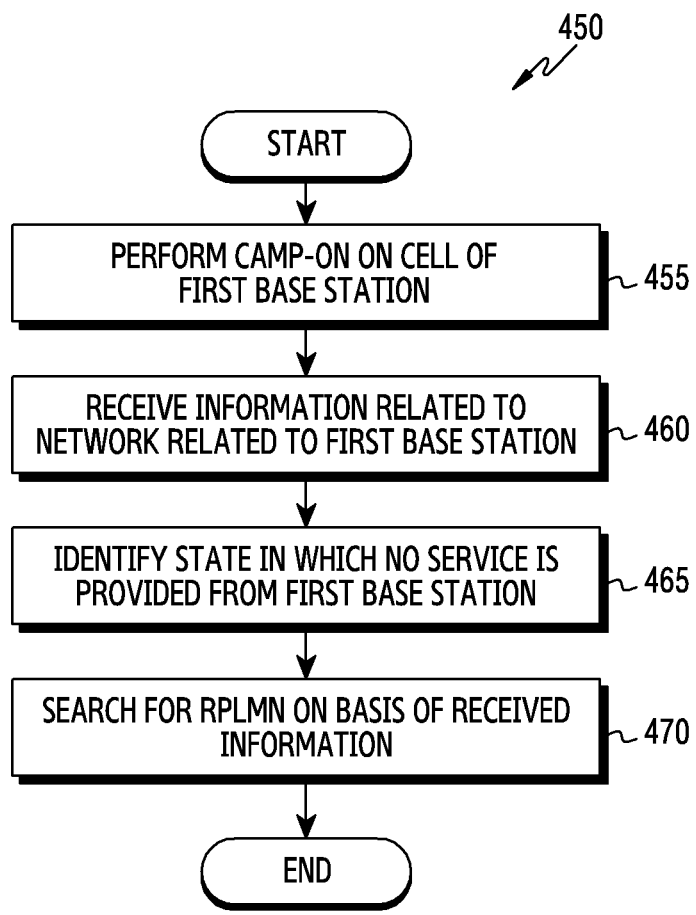
FIG. 4B illustrates an example of an operation in which an electronic device searches for a registered public land mobile network (RPLMN) according to various embodiments.

FIG. 4B illustrates an example of an operation 450 in which an electronic device searches for a registered public land mobile network (RPLMN) according to various embodiments.

Referring to FIG. 4B, in operation 455, the electronic device 101 may perform camp-on on the cell of a first base station (e.g., the electronic device 102). In various embodiments, the electronic device 101 may perform camp-on on the cell of the first base station located in proximity to the electronic device 101 in order to receive a cellular communication service.

In operation 460, after performing camp-on on the cell of the first base station, the electronic device 101 may receive information related to the network related to the first base station. In various embodiments, the information may be received through at least one system information message broadcast from the first base station. In various embodiments, the at least one system information message may include information on resources required to access or use the network. However, the disclosure is not limited thereto. In various embodiments, information related to the network related to the first base station may include RAT information supported by the network.

In various embodiments, the electronic device 101 may store information, related to the network related to the first base station, in a memory (e.g., the memory 130). For example, the electronic device 101 may store the RAT information in the memory. In various embodiments, if another piece of RAT information is stored in the memory before receiving the RAT information in operation 460, the electronic device 101 may change the another piece of RAT information stored in the memory into the RAT information. For example, if another piece of RAT information is stored in the memory before receiving the RAT information in operation 460, the electronic device 101 may update or refine the another piece of RAT information with the RAT information. The electronic device 101 according to various embodiments may maintain the context of the electronic device 101 related to communication in the latest state through the update.

In operation 465, the electronic device 101 may identify that the electronic device 101 is in the state in which no service is provided from the first base station. For example, if the electronic device 101 is located in the shaded area, the electronic device 101 may identify that the electronic device 101 is in the state in which no service is provided from the first base station. In various embodiments, the electronic device 101 may identify that the electronic device 101 is in the state in which no service is provided from the first base station, based on identifying that the signal received from the first base station is not received within a specified time or that the received signal strength indicator (RSSI) of the signal received from the first base station is lower than a threshold. However, the disclosure is not limited thereto.

In operation 470, in response to the identification, the electronic device 101 may search for a registered public land mobile network (RPLMN), based on the received information. In various embodiments, since the electronic device 101 identifies that the electronic device is in the state in which no service is provided from the first base station, the electronic device 101 may search for the RPLMN in order to receive the cellular communication service. In various embodiments, the electronic device 101 may perform the RPLMN, based on the information (e.g., the RAT information), instead of performing the RPLMN on all the RATs available for the electronic device 101. Searching for the RPLMN based on the information may reduce the amount of load of the electronic device 101, which is required to perform the RPLMN.

In various embodiments, if the electronic device 101 identifies that the RPLMN is not found by the searching for the RPLMN, the electronic device 101 may search for an HPLMN using information on the RATs supported by the electronic device 101. In various embodiments, if the electronic device 101 identifies that the HPLMN is not found by the searching for the HPLMN, the electronic device 101 may search for a PLMN available for the electronic device 101. However, the disclosure is not limited thereto.

As described above, the electronic device 101 according to various embodiments, after searching for the RPLMN, based on information received from the first base station on which the electronic device 101 has most recently camped, may sequentially search for the HPLMN and the PLMN. For example, the electronic device 101 may search for the PLMN (for example, search for the RPLMN) from the narrow range, based on the context of the electronic device 101, thereby improving resource efficiency.

Figure 4C:
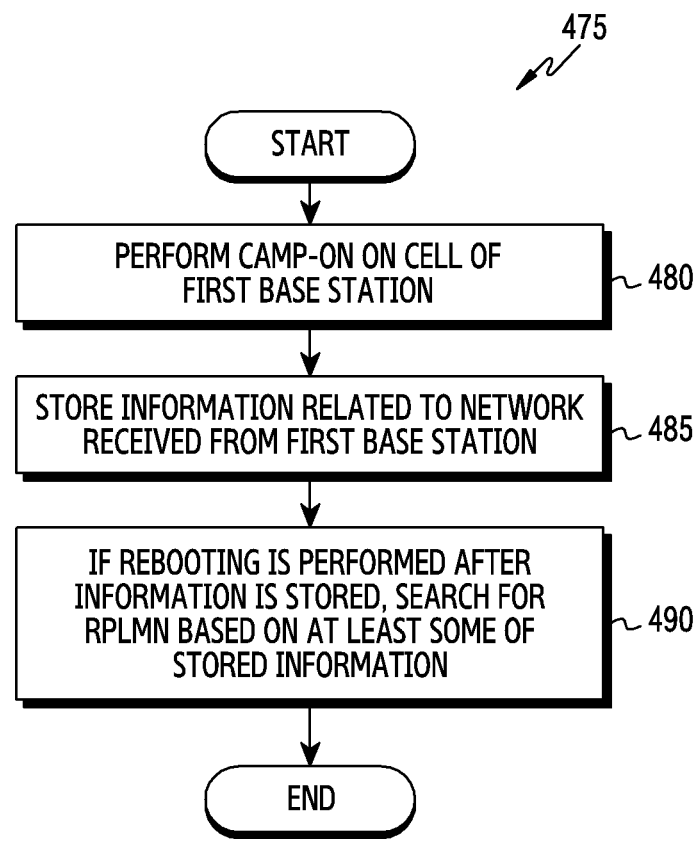
FIG. 4C illustrates another example of an operation in which an electronic device searches for an RPLMN according to various embodiments.

FIG. 4C illustrates another example of an operation in which an electronic device searches for an RPLMN according to various embodiments.

Referring to FIG. 4C, in operation 480, the electronic device 101 may perform camp-on on the cell of the first base station.

In operation 485, the electronic device 101 may store information related to the network, which is received from the first base station. In various embodiments, the information related to the network may be received through the system information message. In various embodiments, the information related to the network may include data for indicating the RAT related to the network. In various embodiments, if the electronic device 101 newly accesses the network thereafter, the electronic device 101 may store information received from the first base station in order to use the data for indicating the RAT.

In operation 490, if the electronic device 101 is rebooted after the information is stored, the electronic device 101 may search for an RPLMN, based on at least some of the stored information. For example, if a user restarts the electronic device 101 that is connected to the first base station, or if a user turns on the electronic device 101 after turning off the electronic device 101 in the state of being connected to the first base station, the electronic device 101 may perform the rebooting. Due to the rebooting, the electronic device 101 may be required to search for a PLMN in order to receive a cellular communication service. The electronic device 101 according to various embodiments may search for an RPLMN, based at least on the information, instead of performing full searching for the PLMN. By searching for the RPLMN as described above, the electronic device 101 may reduce the amount of resource consumption necessary for searching for the PLMN. In addition, the electronic device 101 according to various embodiments may reduce the time for searching for the PLMN by performing searching for the RPLMN.

Figure 5:
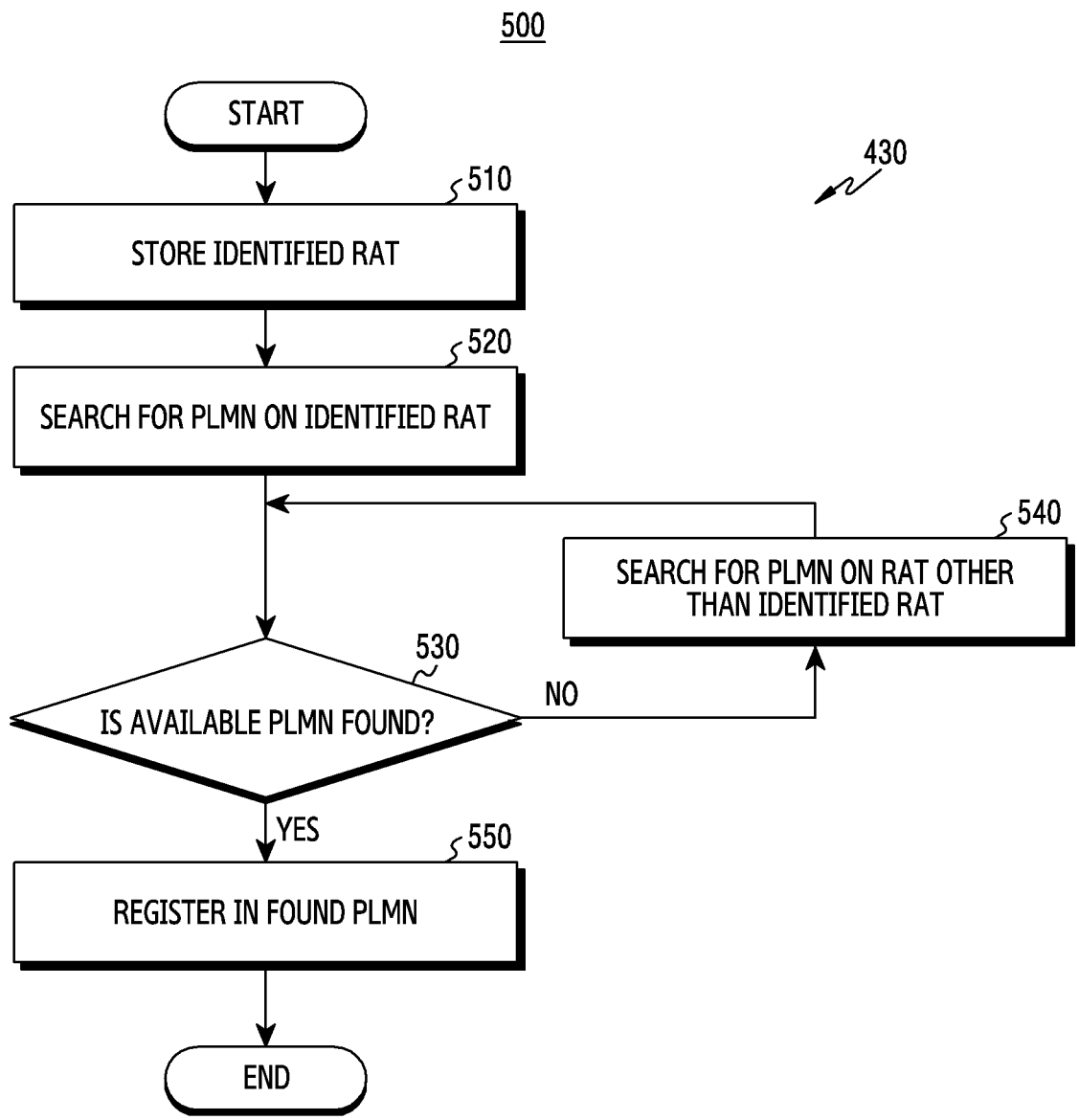
FIG. 5 illustrates an example of an operation in which an electronic device identifies a RAT and then searches for a PLMN on the identified RAT according to various embodiments.

FIG. 5 illustrates an example of an operation in which an electronic device identifies a RAT and then searches for a PLMN on the identified RAT according to various embodiments. This operation may be performed by the electronic device 101 shown in FIG. 1, the electronic device 101 or the electronic device 102 shown in FIG. 2, the electronic device 101 shown in FIG. 3, or the processor 120 of the electronic device 101.

FIG. 5 may be a detailed flowchart of operation 430 described with reference to FIG. 4. Operations 510 to 550 in FIG. 5 may be performed after the electronic device 101 performs operation 420 in FIG. 4.

In operation 510, the electronic device 101 may store at least one identified RAT to be used for searching for a PLMN. In various embodiments, the electronic device 101 may update a previously stored RAT with at least one identified RAT.

In various embodiments, the electronic device 101 may store the at least one RAT in the memory 130. In various embodiments, the at least one stored RAT may be maintained without being deleted even while the power is not supplied to the electronic device 101.

In operation 520, the electronic device 101 may search for a PLMN on at least one identified RAT. In various embodiments, the electronic device 101 may search for an available PLMN using only the RF band of at least one identified RAT. For example, although the electronic device 101 supports all of 2G, 3G, and 4G RATs, if the stored RAT includes only 4G, the electronic device 101 may search for an available PLMN using only the RF band of 4G, excluding the RF bands of 2G and 3G.

In various embodiments, the searching for a PLMN on at least one identified RAT may be searching for the PLMN in which the electronic device 101 most recently registered (registered PLMN).

In various embodiments, the at least one RAT may be at least one of 2G, 3G, 4G, and 5G.

In operation 530, the electronic device 101 may identify whether or not an available PLMN is found as a result of searching for a PLMN. For example, the electronic device 101 may identify whether or not an available PLMN is found as a result of searching for a PLMN on at least one identified RAT. If an available PLMN is not found as a result of searching for a PLMN, the electronic device 101 may perform operation 540. On the other hand, if an available PLMN is found as a result of searching for a PLMN, the electronic device 101 may perform operation 550.

In operation 540, if the electronic device 101 fails to find a PLMN on at least one identified RAT, the electronic device 101 may search for a PLMN on the RAT other than the at least one identified RAT among a plurality of RATs supported by the electronic device 101. The electronic device 101 may search for an available PLMN using a band that is not included in the RF band of the at least one identified RAT, among all the RF bands supported by the electronic device 101. For example, although the electronic device 101 supports all of 2G, 3G, and 4G RATs, if at least one identified RAT includes only 4G, and if no available PLMN is found as a result of searching for a PLMN using only the RF band of 4G, the electronic device 101 may search for an available PLMN using the RF bands of 2G and 3G.

In various embodiments, if the searching for a PLMN on at least one identified RAT is searching for the PLMN in which the electronic device 101 most recently registered (registered PLMN, RPLMN), and if the searching for the PLMN fails as a result of searching for the RPLMN on at least one identified RAT, the electronic device 101 may search for a PLMN other than the RPLMN (e.g., an HPLMN or the like). In this case, the electronic device 101 may search for all the RATs supported by the electronic device 101, instead of performing searching on at least one identified RAT.

After performing operation 540, the electronic device 101 may return to operation 530, and may identify whether or not an available PLMN is found as a result of searching for a PLMN on the RAT other than the at least one identified RAT. In various embodiments, the electronic device 101 may repeat operations 530 and 540 for a predetermined time or until an available PLMN is found.

In operation 550, if an available PLMN is found as a result of searching for the PLMN, the electronic device 101 may register in the found PLMN in response thereto. The electronic device 101 may perform selection of a cell from among the cells of the found PLMN and location registration therein.

Although FIG. 5 shows an example in which the electronic device 101 performs operations 520 to 550 after performing operation 510, operation 510 may be performed regardless of operations 520 to 550 in sequence thereof. For example, operation 510 may be performed simultaneously with operations 520 to 550, and may be performed after operation 520, 530, 540, or 550 is performed.

Figure 6:
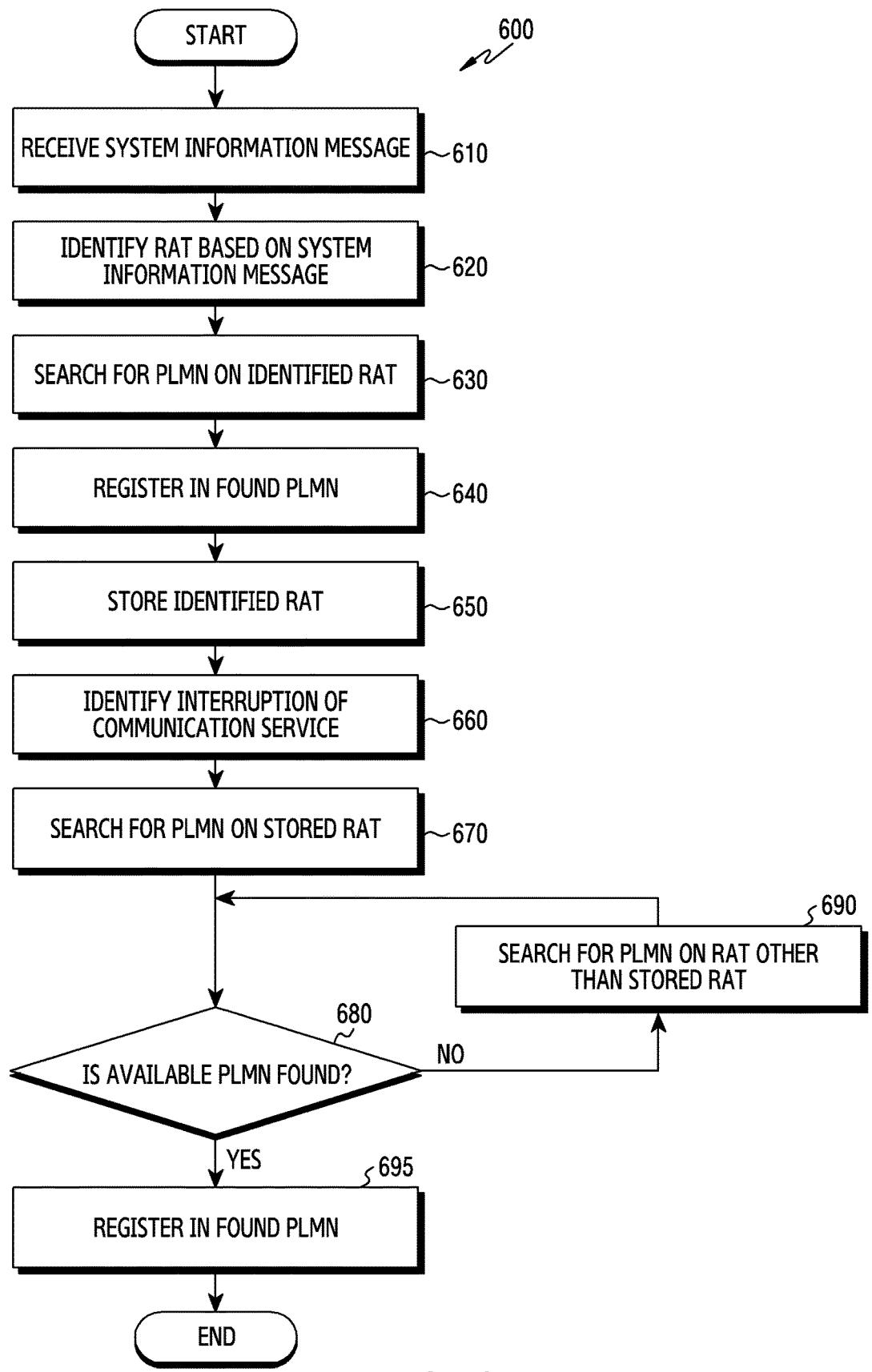
FIG. 6 illustrates an example of an operation in which an electronic device searches for a PLMN according to various embodiments.

FIG. 6 illustrates an example of an operation 600 in which an electronic device searches for a PLMN according to various embodiments. This operation may be performed by the electronic device 101 shown in FIG. 1, the electronic device 101 or the electronic device 102 shown in FIG. 2, the electronic device 101 shown in FIG. 3, or the processor 120 of the electronic device 101.

Operations 610 to 630 in FIG. 6 may correspond to operations 410 to 430 in FIG. 4. Operation 650 in FIG. 6 may correspond to operation 510 in FIG. 5. Operations 670 to 695 in FIG. 6 may correspond to operations 520 to 550 in FIG. 5.

Referring to FIG. 6, in operation 610, the electronic device 101 may receive at least one system information message. In various embodiments, the system information message may include information in order for the electronic device 101 to access a specific cell controlled by a base station and to operate properly. For example, the system information message may include a PLMN ID, a cell ID, RAT information, frequency information, and information related to cell reselection.

In various embodiments, in the case where the electronic device 101 performs cellular communication using an LTE or WCDMA RAT, the system information message may be used to transmit system information blocks (SIBs). The SIBs may be periodically broadcast by the base station to then be transmitted to the electronic device 101.

In various embodiments, the system information message may include information related to scheduling of other SIBs. For example, a list of SIBs to be transmitted and transmission periods thereof may be included in the system information message. For example, information related to scheduling of other SIBs may be included in the system information message such as SIB1.

In various embodiments, the system information message may include information related to inter-frequency or inter-RAT cell reselection. For example, the system information message may include a list of neighbor cells necessary for cell reselection.

In various embodiments, in the case of a system information message in the LTE standard, the information related to cell reselection may be included in the system information message such as SIB5, SIB6, or SIB7. For example, inter-frequency neighbor-cell information may be included in SIB5. For example, WCDMA neighbor-cell information may be included in SIB6. For example, GSM neighbor-cell information may be included in SIB7. In various embodiments, in the case of a system information message in the WCDMA standard, information related to cell reselection may be included in the system information message such as SIB11, SIB12, or SIB19.

In operation 620, the electronic device 101 may identify at least one RAT, based on the received system information message, from among a plurality of supportable RATs. The electronic device 101 may determine the RAT supported by the network that transmitted the system information message and/or the RAT that is not supported by the same, based on the system information message.

In various embodiments, the electronic device 101 may identify the at least one RAT, based on information related to the inter-frequency or inter-RAT cell reselection, which is included in the system information message. In various embodiments, the electronic device 101 may identify the at least one RAT from information on the neighbor cell necessary for cell reselection, which is included in the system information message. For example, the electronic device 101 may identify the at least one RAT by determining the RAT served by a neighbor cell included in the system information message.

For example, if the electronic device 101 receives a system information message in the LTE standard, the electronic device 101 may identify the at least one RAT, based on the system information message such as SIB5, SIB6, or SIB7 including information related to cell reselection. For example, if the electronic device 101 receives SIB5, and if SIB5 includes neighbor-cell information, the electronic device 101 may determine that the network that transmitted SIB5 supports LTE. For example, if the electronic device 101 receives SIB6, and if SIB6 includes neighbor-cell information, the processor may determine that the network that transmitted SIB6 supports WCDMA. For example, if the electronic device 101 receives SIB7, and if SIB7 includes neighbor-cell information, the electronic device 101 may determine that the network that transmitted SIB7 supports a GSM RAT.

For example, if the electronic device 101 receives a system information message in the WCDMA standard, the electronic device 101 may identify the at least one RAT using the system information message such as SIB11, SIB12, or SIB19 including information related to cell reselection. For example, if the electronic device 101 receives a system information message in the GSM standard, the electronic device 101 may identify the at least one RAT, based on the system information message such as an SI2 quarter including information related to cell reselection.

In various embodiments, the electronic device 101 may identify the at least one RAT, based on information related to scheduling of system information blocks (SIBs), which is included in the system information message. For example, if the electronic device 101 receives a system information message in the LTE or WCDMA standard, the electronic device 101 may identify the at least one RAT from a list of SIBs to be transmitted, which is included in the received SIB1. For example, if SIB5, SIB6, or SIB7 is included in the list of SIBs to be transmitted, which is included in SIB1, the electronic device 101 may determine LTE, WCDMA, or GSM to be the RAT supported by the network that transmitted SIB1 in each case. Alternatively, if SIB6 or SIB7 is not included in the list of SIBs to be transmitted, the electronic device 101 may determine WCDMA or GSM to be the RAT that is not supported by the network that transmitted SIB1 in each case.

In operation 630, the electronic device 101 may search for a PLMN on the at least one identified RAT. In various embodiments, the electronic device 101 may search for an available PLMN using only the RF band of the at least one identified RAT.

Operation 630 may correspond to operation 430 in FIG. 4 or operations 520 to 550 in FIG. 5. In various embodiments, if the electronic device 101 fails to find a PLMN on the at least one identified RAT, the electronic device 101 may search for a PLMN on the RATs other than the at least one identified RAT among a plurality of RATs supported by the electronic device 101. The electronic device 101 may search for an available PLMN using a band that is not included in the RF band of the at least one identified RAT, among all RF bands supported by the electronic device. In various embodiments, the electronic device 101 may repeat searching for a PLMN for a predetermined time or until an available PLMN is found.

In operation 640, if an available PLMN is found as a result of searching for the PLMN, the electronic device 101 may register in the found PLMN in response thereto. The electronic device 101 may perform selection of a cell from among the cells of the found PLMN and location registration therein.

In operation 650, the electronic device 101 may store at least one identified RAT to be used for searching for a PLMN. For example, the electronic device 101 may store the at least one RAT in response to selection of a PLMN. For example, the electronic device 101 may store the at least one RAT in response to location registration therein. In various embodiments, the electronic device 101 may update a previously stored RAT with the at least one RAT.

In various embodiments, the electronic device 101 may store the at least one RAT in the memory 130. In various embodiments, the at least one stored RAT may be maintained without being deleted even while power is not supplied to the electronic device 101.

In operation 660, the electronic device 101 may identify interruption of a communication service, which is provided to the electronic device 101 by the registered PLMN, after storing the at least one RAT. For example, the electronic device 101 may identify that the electronic device 101 in a turn-off state switches to a turn-on state. For example, the electronic device 101 may identify the lack of coverage.

In operation 670, in response to identifying the interruption of the communication service, the electronic device 101 may search for a PLMN on at least one stored RAT. In various embodiments, the electronic device 101 may search for an available PLMN using only the RF band of the at least one stored RAT. For example, although the electronic device 101 supports all of 2G, 3G, and 4G RATs, if the at least one stored RAT includes only 4G, the electronic device 101 may search for an available PLMN using only the RF band of 4G, excluding the RF bands of 2G and 3G.

In various embodiments, the searching for a PLMN on the at least one stored RAT may be searching for the PLMN in which the electronic device 101 most recently registered (registered PLMN).

In operation 680, the electronic device 101 may identify whether or not an available PLMN is found as a result of searching for the PLMN on the at least one stored RAT. If no available PLMN is found as a result of searching for the PLMN, the electronic device 101 may perform operation 690. On the other hand, if an available PLMN is found as a result of searching for the PLMN, the electronic device 101 may perform operation 695.

In operation 690, if the electronic device 101 fails to find a PLMN on the at least one stored RAT, the electronic device 101 may search for a PLMN on the RATs other than the at least one stored RAT among a plurality of RATs supported by the electronic device 101. The electronic device 101 may search for an available PLMN using a band that is not included in the RF band of the at least one stored RAT, among all RF bands supported by the electronic device 101. For example, although the electronic device 101 supports all of 2G, 3G, and 4G RATs, if the at least one stored RAT includes only 4G, and if no available PLMN is found as a result of searching for the PLMN using only the RF band of 4G, the electronic device 101 may search for an available PLMN using the RF bands of 2G and 3G.

In various embodiments, if the searching for a PLMN on the at least one identified RAT is searching for the PLMN in which the electronic device 101 most recently registered (registered PLMN), and if the searching for the PLMN fails as a result of searching for the RPLMN on the at least one stored RAT, the electronic device 101 may search for a PLMN other than the RPLMN (e.g., an HPLMN or the like). In this case, the electronic device 101 may search for all the RATs supported by the electronic device 101, instead of searching for the at least one stored RAT.

After performing operation 690, the electronic device 101 may return to operation 680, and may identify whether or not an available PLMN is found as a result of searching for a PLMN on the RAT other than the at least one stored RAT. The electronic device 101 may repeat operations 680 and 690 for a predetermined time or until an available PLMN is found.

In operation 695, if an available PLMN is found as a result of searching for the PLMN, the electronic device 101 may register in the found PLMN in response thereto. The electronic device 101 may perform selection of a cell from among the cells of the found PLMN and location registration therein.

Although FIG. 6 shows an example in which the electronic device 101 performs operation 650 after performing operations 630 and 640, operation 650 may be performed regardless of operations 630 and 640 in sequence thereof. For example, operation 650 may be performed simultaneously with operation 630 or 640, and may be performed after operation 620 or 630 is performed.

Figure 7:
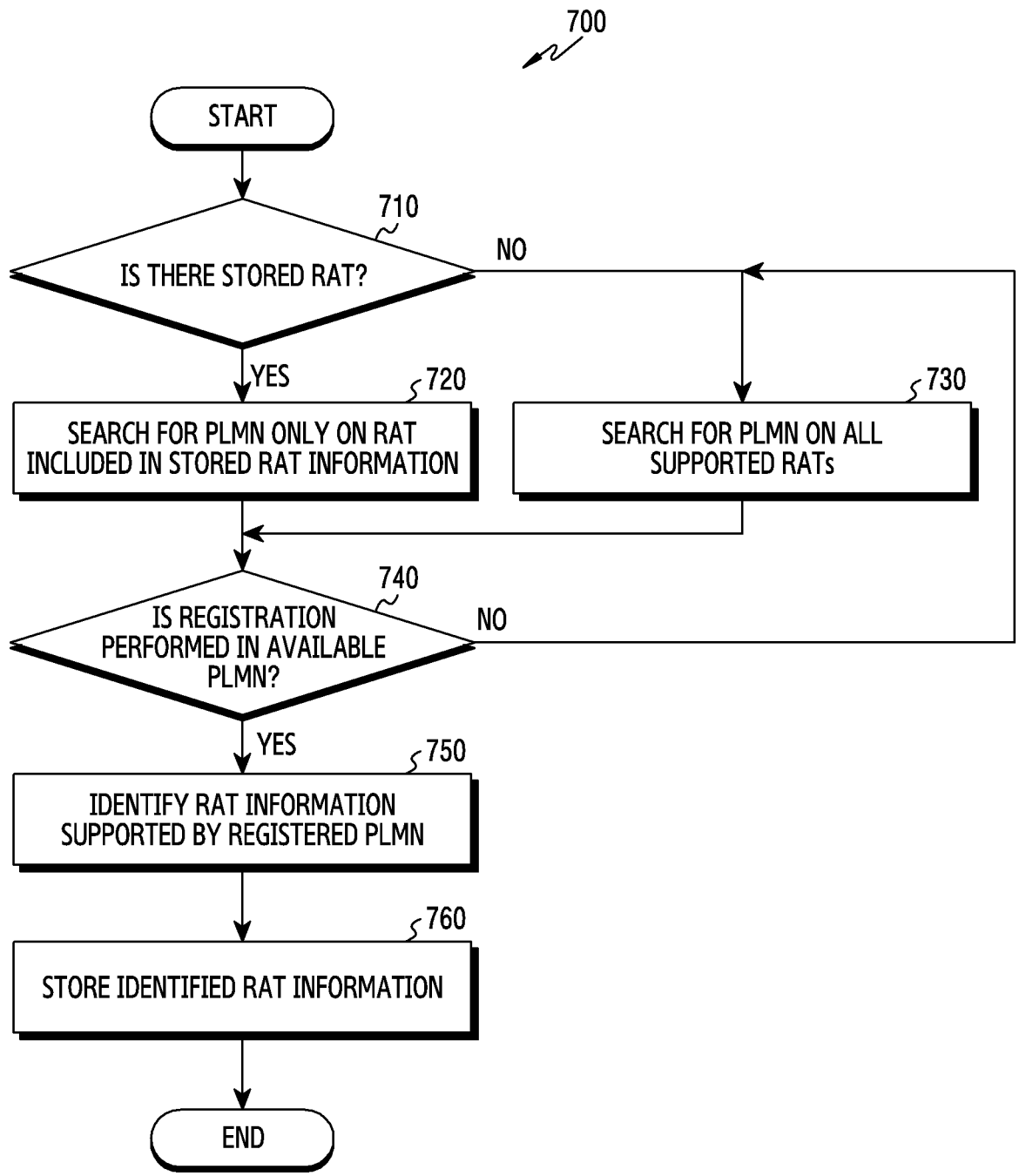
FIG. 7 illustrates another example of the operation of an electronic device according to various embodiments.

FIG. 7 illustrates another example of the operation 700 of an electronic device that searches for a PLMN according to various embodiments. This operation may be performed by the electronic device 101 shown in FIG. 1, the electronic device 101 or the electronic device 102 shown in FIG. 2, the electronic device 101 shown in FIG. 3, or the processor 120 of the electronic device 101.

Referring to FIG. 7, in operation 710, the electronic device 101 may identify whether or not there is RAT information stored in the memory 130. According to various embodiments, if it is determined that a PLMN is required to be searched for, the electronic device 101 may identify whether or not there is RAT information stored in the memory 130. For example, the electronic device 101 may identify whether or not there is RAT information stored in the memory 130 immediately after the electronic device 101 is turned off and then turned on. For example, the electronic device 101 may identify whether or not there is RAT information stored in the memory 130 immediately after recovering from the lack of coverage.

If there is RAT information stored in the memory 130, the electronic device 101 may perform operation 720. On the other hand, if there is no RAT information stored in the memory 130, the electronic device 101 may perform operation 730.

In operation 720, in response to identifying that there is the stored RAT information, the electronic device 101 may search for a PLMN on at least one RAT included in the stored RAT information. In various embodiments, the electronic device 101 may search for an available PLMN using only the RF band of the at least one RAT. For example, although the electronic device 101 supports all of 2G, 3G, and 4G RATs, if the at least one RAT includes only 4G, the electronic device 101 may search for an available PLMN using only the RF band of 4G, excluding the RF bands of 2G and 3G.

In various embodiments, the searching for a PLMN on the at least one RAT may be searching for the PLMN in which the electronic device 101 most recently registered (registered PLMN).

In various embodiments, the at least one RAT may be at least one of 2G, 3G, 4G, and 5G.

In various embodiments, if an available PLMN is found as a result of searching for the PLMN on the at least one RAT, the electronic device 101 may register in the found PLMN in response thereto. The electronic device 101 may perform selection of a cell from among the cells of the found PLMN and location registration therein.

In operation 730, in response to identifying that there is no stored RAT information, the electronic device 101 may search for a PLMN on all the RATs supported by the electronic device 101. The electronic device 101 may search for an available PLMN using all the RF bands supported by the electronic device 101. In various embodiments, if an available PLMN is found as a result of searching for the PLMN on all the supported RATs, the electronic device 101 may register in the found PLMN in response thereto. The electronic device 101 may perform selection of a cell from among the cells of the found PLMN and location registration therein.

In operation 740, the electronic device 101 may identify whether or not registration is performed in the available PLMN as a result of the searching for the PLMN performed in operation 720 or 730. If the registration is performed in the available PLMN as a result of searching for the PLMN, the electronic device 101 may perform operation 750. On the other hand, if the registration fails in the available PLMN as a result of searching for the PLMN, the electronic device 101 may return to operation 730, and may then search for a PLMN for all the RATs supported by the electronic device 101. The electronic device 101 may repeat operations 730 and 740 for a predetermined period of time or until an available PLMN is found and registered.

In operation 750, in response to the registration performed in the available PLMN as a result of searching for the PLMN, the electronic device 101 may identify RAT information supported by the registered PLMN. In various embodiments, the electronic device 101 may receive at least one system information message provided from the registered PLMN, and may identify at least one RAT supported by the registered PLMN, based on the received system information message.

In various embodiments, the system information message may include information in order for the electronic device 101 to access a specific cell controlled by a base station belonging to the registered PLMN and to operate properly. For example, the system information message may include a PLMN ID, a cell ID, RAT information, frequency information, and information related to cell reselection.

In various embodiments, in the case where the electronic device 101 performs cellular communication using the registered PLMN and an LTE or WCDMA RAT, the system information message may be used to transmit system information blocks (Ms).

In various embodiments, the system information message may include information related to scheduling of other SIBs. For example, a list of SIBs to be transmitted and transmission periods thereof may be included in the system information message. For example, information related to scheduling of other SIBs may be included in the system information message such as SIB1.

In various embodiments, the system information message may include information related to inter-frequency or inter-RAT cell reselection. For example, the system information message may include a list of neighbor cells necessary for cell reselection.

For example, in the case where the electronic device 101 performs cellular communication using the registered PLMN and an LTE RAT, the information related to cell reselection may be included in the system information message such as SIB5, SIB6, or SIB7. SIB5, SIB6, or SIB7 may include inter-frequency neighbor-cell information, WCDMA neighbor-cell information, and GSM neighbor-cell information, respectively. For example, in the case where the electronic device 101 performs cellular communication using the registered PLMN and a WCDMA RAT, information related to cell reselection may be included in the system information message such as SIB11, SIB12, or SIB19.

In various embodiments, the electronic device 101 may identify RAT information supported by the registered PLMN, based on the information related to the inter-frequency or inter-RAT cell reselection, which is included in the system information message. In various embodiments, the electronic device 101 may identify RAT information supported by the registered PLMN from information on the neighbor cell necessary for cell reselection, which is included in the system information message. For example, the electronic device 101 may determine the RAT served by the neighbor cell included in the system information message, thereby identifying RAT information supported by the registered PLMN.

For example, in the case where the electronic device 101 performs cellular communication using the registered PLMN and an LTE RAT, the electronic device 101 may identify RAT information supported by the registered PLMN, based on the system information message such as SIB5, SIB6, or SIB7 including information related to cell reselection. For example, if the electronic device 101 receives SIB5, and if SIB5 includes neighbor-cell information, the electronic device 101 may determine that the registered PLMN supports LTE. For example, if the electronic device 101 receives SIB6, and if SIB6 includes neighbor-cell information, the electronic device 101 may determine that the registered PLMN supports WCDMA. For example, if the electronic device 101 receives SIB7, and if SIB7 includes neighbor-cell information, the electronic device 101 may determine that the registered PLMN supports a GSM RAT.

For example, if the electronic device 101 performs cellular communication using the registered PLMN and a WCDMA RAT, the electronic device 101 may identify RAT information supported by the registered PLMN using the system information message, such as SIB11, SIB12, or SIB19, including information related to cell reselection.

For example, if the electronic device 101 performs cellular communication using the registered PLMN and a GSM RAT, the electronic device 101 may identify RAT information supported by the registered PLMN, based on an SI2 quarter message including information related to cell reselection.

In various embodiments, the electronic device 101 may identify RAT information supported by the registered PLMN, based on information related to scheduling of system information blocks (SIBs), which is included in the system information message. For example, if the electronic device 101 performs cellular communication using the registered PLMN and an LTE RAT, the electronic device 101 may identify RAT information supported by the registered PLMN, from a list of SIBs to be transmitted, which is included in SIB1. For example, if SIB5, SIB6, or SIB7 is included in the list of SIBs to be transmitted, which is included in SIB1, the electronic device 101 may determine LTE, WCDMA, or GSM to be the RAT supported by the registered PLMN in each case. Alternatively, if SIB6 or SIB7 is not included in the list of SIBs to be transmitted, the electronic device 101 may determine WCDMA or GSM to be the RAT that is not supported by the registered PLMN in each case.

In operation 760, based on identification of the RAT information supported by the registered PLMN, the electronic device 101 may store the RAT information supported by the registered PLMN in order to use the same in searching for a PLMN. For example, the electronic device 101 may update existing RAT information with the RAT information supported by the registered PLMN. In various embodiments, the electronic device 101 may store the RAT information supported by the registered PLMN in the memory 130. In various embodiments, the stored RAT information may be maintained without being deleted even while power is not supplied to the electronic device 101.

As described above, a method of an electronic device (e.g., the electronic device 101) according to various embodiments may include: performing camp-on on a cell of a first base station; receiving, from the first base station, information related to a network related to the first base station, identifying a state in which no service is provided from the first base station to the electronic device, and searching for a registered public land mobile network (RPLMN), based at least in part on the received information.

In various embodiments, the information related to the network may include at least one system information block (SIB), and the at least one SIB may include radio access technology (RAT) information, which is supported by the network. In various embodiments, the searching for the RPLMN may include searching for the RPLMN using the RAT information supported by the network. In various embodiments, the method may include storing the RAT information in the memory and, if the network information is changed, updating the RAT information.

In various embodiments, the method may further include, if the RPLMN is not found by searching for the RPLMN, searching for an HPLMN using RAT information supported by the electronic device. In various embodiments, the method may further include, if the HPLMN is not found by searching for the HPLMN, searching for a PLMN available for the electronic device.

A method for operating an electronic device according to various embodiments described above may include: performing camp-on on a cell of a first base station, storing information related to a network, which is received from the first base station, and if the electronic device is rebooted after storing the information, searching for a registered public land mobile network (RPLMN), based at least in part on the stored information.

In various embodiments, the information related to the network may be received from the first base station through at least one system information message. In various embodiments, the at least one system information message may be used to provide information related to inter-frequency or inter-RAT cell reselection.

In various embodiments, the searching for the RPLMN may be performed in response to identifying that the rebooting is completed.

As described above, a method for operating an electronic device (e.g., the electronic device 101) in a wireless communication system according to various embodiments may include receiving at least one system information message, identifying at least one RAT among a plurality of radio access technologies (RATs) supported by the electronic device, based on the at least one system information message, and searching for a public land mobile network (PLMN) on the at least one RAT.

In various embodiments, the method may further include storing at least one identified RAT in order to use the same in searching for a PLMN. In some embodiments, the method may further include switching the electronic device from a turn-off state to a turn-on state after storing the at least one RAT, in response to the switching, searching for a PLMN on the at least one stored RAT, and in response to identifying that the searching for the PLMN fails, searching for a PLMN on a RAT other than the at least one stored RAT among the plurality of RATs. In some embodiments, the method may further include: identifying interruption of communication service for the electronic device after storing the at least one RAT; in response to the identification, searching for a PLMN on the at least one stored RAT; and in response to identifying that the searching for the PLMN fails, searching for a PLMN on a RAT other than the at least one stored RAT among the plurality of RATs.

In various embodiments, the at least one system information message may be information related to inter-frequency or inter-RAT cell reselection. In various embodiments, the at least one system information message may be information related to scheduling of system information blocks (SIBs).

In various embodiments, the method may further include, in response to identifying that the searching for the PLMN on the at least one RAT fails, searching for a PLMN on a RAT other than the at least one RAT among the plurality of RATs.

In various embodiments, the method may further include: if an available PLMN is found as a result of searching for the PLMN on the at least one RAT, registering in the found PLMN in response thereto; in response to the registration, identifying at least one RAT supported by the registered PLMN, based on the system information message of the registered PLMN; and storing the at least one RAT supported by the registered PLMN.

In various embodiments, the searching for the PLMN on the at least one RAT may be searching for the PLMN in which the electronic device most recently registered (registered PLMN).

In various embodiments, the at least one RAT may be at least one of 2G, 3G, 4G, and 5G.

As described above, a method for operating an electronic device (e.g., the electronic device 101) in a wireless communication system according to various embodiments may include: identifying whether or not RAT information supported by a PLMN is stored in the electronic device; if the RAT information is stored in the electronic device, searching for a public land mobile network (PLMN) on at least one RAT included in the stored RAT information; in response to registration of the electronic device in an available PLMN, identifying RAT information supported by the registered PLMN; and, based on the identification, storing the RAT information supported by the registered PLMN.

In various embodiments, the identifying RAT information supported by the registered PLMN may include: receiving at least one system information message provided from the registered PLMN; and identifying at least one RAT, based on the at least one system information message.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device supporting a plurality of radio access technologies (RATs), the electronic device comprising:
  at least one memory;
  a communication circuit; and
  at least one processor operatively coupled to the at least one memory and the communication circuit, wherein the at least one processor is configured to:
    identify information of a first RAT from among information of a plurality of RATs that is stored in the at least one memory,
    in response to identifying the information of the first RAT stored in the at least one memory, perform a search for a public land mobile network (PLMN) on the first RAT,
    in response to identifying that the information of the first RAT is not stored in the at least one memory, perform a search for a PLMN on all RATs of the plurality of RATs supported by the electronic device,
    identify an available PLMN as a result of the search for the PLMN on the first RAT or the search for the PLMN on all RATs, and register the available PLMN and store RAT information supported by the available PLMN.

2. The electronic device of claim 1, wherein the at least one processor is further configured to receive at least one system information message through the communication circuit, and
   wherein the at least one system information message is provided from the registered PLMN.

3. The electronic device of claim 2, wherein the at least one system information message comprises information related to an inter-frequency or an inter-RAT cell reselection, and
   wherein the at least one system information message comprises information related to a scheduling of system information blocks (SIBs).

4. The electronic device of claim 1, wherein the at least one processor is further configured to search for a PLMN on a RAT other than the first RAT among the plurality of RATs in response to identifying that searching for the PLMN on the first RAT fails.

5. The electronic device of claim 1,
   wherein storing RAT information supported by the available PLMN comprising updating the information of the plurality of RATs stored in the at least one memory with the RAT information supported by the available PLMN.

6. The electronic device of claim 1, wherein searching for the PLMN on the first RAT comprises searching for the PLMN in which the electronic device most recently registered.

7. The electronic device of claim 1, wherein the first RAT comprises at least one of a second generation (2G), a 3G, a 4G, or a 5G.

* * * * *